US012763062B2

(12) United States Patent
Shaw et al.

(10) Patent No.: US 12,763,062 B2
(45) Date of Patent: Oct. 13, 2026

(54) MUSIC GENERATION METHOD, APPARATUS AND SYSTEM, AND STORAGE MEDIUM

(71) Applicant: Lemon Inc., Grand Cayman (KY)

(72) Inventors: Andrew Shaw, Los Angeles, CA (US); Yilin Zhang, Los Angeles, CA (US); Jitong Chen, Los Angeles, CA (US); Vibert Thio, Los Angeles, CA (US); Shawn Chan Zhen Yi, Los Angeles, CA (US); Liangqin Xu, Beijing (CN); Yufan Xue, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/725,372

(22) PCT Filed: Apr. 27, 2023

(86) PCT No.: PCT/SG2023/050291
§ 371 (c)(1),
(2) Date: Jun. 28, 2024

(87) PCT Pub. No.: WO2023/211387
PCT Pub. Date: Nov. 2, 2023

(65) Prior Publication Data

US 2025/0069585 A1 Feb. 27, 2025

(30) Foreign Application Priority Data

Apr. 29, 2022 (CN) ......................... 202210474514.5

(51) Int. Cl.
*G10L 13/02* (2013.01)

(52) U.S. Cl.
CPC ................................... *G10L 13/02* (2013.01)

(58) Field of Classification Search
CPC ........... G10H 1/0025; G10H 2210/061; G10H 2210/115; G10H 2240/131;
(Continued)

(56) References Cited

U.S. PATENT DOCUMENTS

| | | | | |
|---|---|---|---|---|
| 11,830,463 | B1 * | 11/2023 | Kurek | G10H 1/0025 |
| 2004/0186720 | A1 * | 9/2004 | Kemmochi | G10H 5/00 704/258 |

(Continued)

FOREIGN PATENT DOCUMENTS

| | | | |
|---|---|---|---|
| CN | 101996627 | A | 3/2011 |
| CN | 108877753 | A | 11/2018 |

(Continued)

OTHER PUBLICATIONS

International Search Report and Written Opinion received for PCT Patent Application No. PCT/SG2023/050291, mailed on Nov. 1, 2023, 12 pages (3 pages of English Translation and 9 pages of Original Document).

(Continued)

*Primary Examiner* — Douglas Godbold

(57) ABSTRACT

The present disclosure relates to a music generation method, apparatus and system, and storage medium. In an embodiment of the present disclosure: obtaining text information, and converting the text information into a corresponding voice audio; obtaining an initial music audio, wherein the initial music audio comprises a music key point, and music characteristics of the initial music audio have a sudden change at the position of an audio key point; and on the basis of the position of the music key point, synthesizing the voice audio and the initial music audio to obtain a target music audio. In the target music audio, the voice audio appears at the position of the music key point of the initial music audio. Thus, a music audio is generated from text information, and
(Continued)

the user can customize the content of the text information and customize the initial music audio.

17 Claims, 3 Drawing Sheets

(58) Field of Classification Search
CPC ........... G10H 2250/455; G10H 1/0033; G10H 2210/031; G10H 2250/471; G10L 13/033; G10L 13/0335; G10L 13/08; G10L 13/00
See application file for complete search history.

(56) References Cited

U.S. PATENT DOCUMENTS

| | | | | |
|---|---|---|---|---|
| 2008/0097754 | A1* | 4/2008 | Goto | G10L 15/26 704/214 |
| 2008/0264241 | A1* | 10/2008 | Lemons | G10L 21/06 84/645 |
| 2009/0292535 | A1 | 11/2009 | Seo | |
| 2012/0312145 | A1 | 12/2012 | Kellett et al. | |
| 2015/0120286 | A1 | 4/2015 | Ikeda et al. | |
| 2017/0229114 | A1* | 8/2017 | Ikeda | G10L 21/02 |
| 2019/0385578 | A1* | 12/2019 | Yang | G10H 7/02 |
| 2020/0372896 | A1* | 11/2020 | Cui | G11B 27/02 |
| 2021/0312897 | A1* | 10/2021 | Ackerman | G11B 27/031 |
| 2022/0223125 | A1* | 7/2022 | Zhou | G06N 3/0464 |

FOREIGN PATENT DOCUMENTS

| | | | |
|---|---|---|---|
| CN | 110189741 | A | 8/2019 |
| CN | 112669849 | A | 4/2021 |
| JP | 2001-125599 | A | 5/2001 |
| JP | 2004-341338 | A | 12/2004 |
| JP | 2005-037846 | A | 2/2005 |
| JP | 2005-037848 | A | 2/2005 |
| WO | 2016/157377 | A1 | 10/2016 |

OTHER PUBLICATIONS

European Search Report for EP Patent Application No. 23796956.3, Issued on Apr. 1, 2026, 12 pages.
Office action received for Chinese patent application No. 202210474514.5 mailed on Mar. 29, 2026, 12 pages (6 pages English Translation and 6 pages Original document).

* cited by examiner

MUSIC GENERATION METHOD, APPARATUS AND SYSTEM, AND STORAGE MEDIUM

CROSS REFERENCE TO RELATED APPLICATIONS

This application is a National Stage of International Application No. PCT/SG2023/050291 filed Apr. 27, 2023, which claims benefit of Chinese Patent Application No. 202210474514.5 filed Apr. 29, 2022, both of which are herein incorporated by reference in their entireties.

TECHNICAL FIELD

The present disclosure relates to the technical field of multimedia content processing, and in particular, to a music generation method, apparatus, system and storage medium.

BACKGROUND

Artificial intelligence music creation is a hot topic in current technology, and some progress has been made in automatic music generation.

SUMMARY

The present disclosure provides a music generation method, apparatus, system and storage medium.

In a first aspect, the present disclosure provides a music generation method, comprising:

obtaining text information, and performing voice synthesis on the text information, so as to obtain a voice audio corresponding to the text information;

obtaining an initial music audio, the initial music audio including a music key point, and music characteristics of the initial music audio having a sudden change at the position of an audio key point;

synthesizing the voice audio and the initial music audio based on the position of the music key point to obtain a target music audio; in the target music audio, the voice audio appears at the position of the music key point of the initial audio music.

In some embodiments, the performing voice synthesis on the text information so as to obtain a voice audio corresponding to the text information comprises:

converting the text information into a corresponding voice using a text-to-speech method;

in response to an operation of selecting a timbre, selecting a target timbre from a plurality of preset timbres;

based on the target timbre, converting the voice corresponding to the text information into a voice audio.

In some embodiments, the obtaining an initial music audio comprises:

in response to an operation of selecting a music category, selecting a target music category from a plurality of preset music categories;

selecting one music audio as the initial music audio from a plurality of music audios corresponding to the target music category.

In some embodiments, the selecting one music audio as the initial music audio from a plurality of music audios corresponding to the target music category comprises:

obtaining a plurality of music style templates corresponding to the target music category, the music style templates being audio templates for generating music, created based on melody, chord progression and orchestration; and in response to an operation of selecting a music style template, selecting a target music style template from the plurality of music style templates as the initial music audio; or, randomly selecting a music style template from the plurality of music style templates as the initial music audio.

In some embodiments, the audio key point is located at any of a plurality of preset positions in the music style template, wherein the plurality of preset positions include at least one of:

a preset position before a chorus in the music style templates, a position in the music style template where its beat intensity is greater than or equal to a preset threshold, a preset position before or after a phrase in the music style template.

In some embodiments, the synthesizing the voice audio and the initial music audio based on the position of the music key point to obtain a target music audio comprises:

randomly matching the voice audio with at least one music key point, and different voice audios being matched with different music key points; and injecting the voice audio into the initial music audio at the matched music key point based on a result of the randomly matching, and synthesizing the injected voice audio and the initial music audio into the target music audio.

In some embodiments, the synthesizing the voice audio and the initial music audio based on the position of the music key point to obtain a target music audio comprises:

matching the voice audio with at least one music key point according to a preset strategy, and different voice audios being matched different music key points; and injecting the voice audio into the initial music audio at the matched music key point based on a result of matching according to the preset strategy, and synthesizing the injected voice audio and the initial music audio into the target music audio.

In some embodiments, the synthesizing the injected voice audio and the initial music audio into the target music audio comprises:

performing at least one of reverberation processing, delay processing, compression processing and volume processing on the injected voice audio and the initial music audio to obtain the target music audio.

In a second aspect, the present disclosure further proposes a music generation apparatus, comprising:

a first obtaining unit, configured to obtain text information;

a first synthesis unit, configured to perform voice synthesis on the text information, so as to obtain a voice audio corresponding to the text information;

a second obtaining unit, configured to obtain an initial music audio, the initial music audio including a music key point, and music characteristics of the initial music audio having a sudden change at the position of an audio key point;

a second synthesis unit, configured to synthesize the voice audio and the initial music audio based on the position of the music key point to obtain a target music audio; in the target music audio, the voice audio appears at the position of the music key point of the initial music audio.

In a third aspect, the present disclosure further provides a system comprising at least one computing apparatus and at least one storage apparatus for storing instructions, wherein the instructions, when executed by the at least one computing apparatus, cause the at least one computing apparatus to perform steps of the music generation method as described above.

In a fourth aspect, the present disclosure further provides a computer-readable storage medium, wherein the computer-readable storage medium stores a program or instructions that, when executed by at least one computing apparatus, cause the at least one computing apparatus to perform steps of the music generation method as described above.

The technical solutions provided by the embodiments of the present disclosure have the following advantages compared with related arts:

In the technical solution provided by the embodiments of the present disclosure, obtaining text information, and converting the text information into a corresponding voice audio; and obtaining an initial music audio, wherein the initial music audio comprises a music key point, and music characteristics of the initial music audio have a sudden change at the position of an audio key point; so that, on the basis of the position of the music key point, synthesizing the voice audio and the initial music audio to obtain a target music audio. In the target music audio, the voice audio appears at the position of the music key point of the initial music audio. Thus, a music audio is generated from text information, and the user can customize the content of the text information and customize the initial music audio.

BRIEF DESCRIPTION OF THE DRAWINGS

Herein, the accompanying drawings, which are incorporated in and constitute a part of this specification, illustrate embodiments consistent with the disclosure, and together with the specification, serve to explain principles of the disclosure.

In order to more clearly illustrate the technical solutions in the embodiments of the present disclosure or related arts, the following will briefly introduce the drawings needed when describing the embodiments or related arts. Obviously, for those of ordinary skill in the art, other drawings may also be obtained based on these drawings without incurring any creative effort.

DETAILED DESCRIPTION

In order to understand the above objects, features and advantages of the present disclosure more clearly, the solutions of the present disclosure will be further described below. It should be noted that, as long as there is no conflict, the embodiments of the present disclosure and the features in the embodiments may be combined with each other.

Many specific details are set forth in the following description to fully understand the present disclosure, but the present disclosure may also be implemented in other ways different from those described here; obviously, the embodiments in the description are only part, and not all of the embodiments of the present disclosure.

Artificial intelligence music creation is a hot topic in current technology, and some progress has been made in automatic music generation. However, as far as current technology is concerned, although artificial intelligence-based systems may generate a variety of music, it is not possible to achieve personalized customization in the process of generation.

Figure 1:
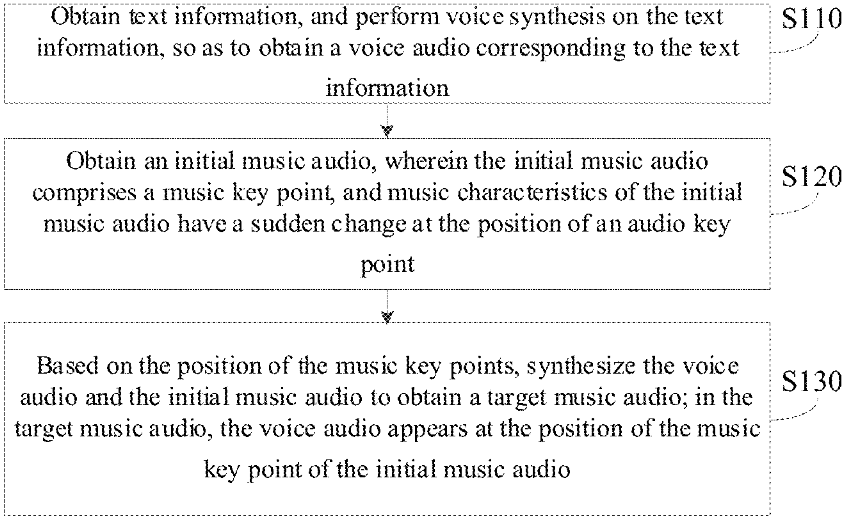
FIG. 1 is a flow chart of a music generation method provided by an embodiment of the present disclosure.

FIG. 1 is a flow chart of a music generation method provided by an embodiment of the present disclosure. This embodiment may be applied to situations of personalized music customization in clients. The method may be executed by a music generation apparatus, which may be implemented in software and/or hardware, and may be configured in an electronic device, such as a terminal, including but not limited to a smart phone, a PDA, a tablet, a wearable device with a display screen, a desktop, a laptop, an all-in-one computer, a smart home appliance, etc. Alternatively, this embodiment may be applied to situations of personalized music customization in servers. The method may be executed by a music generation apparatus, which may be implemented in software and/or hardware, and may be configured in an electronic device, such as a server.

As shown in FIG. 1, the method may specifically comprise:

S110. obtaining text information, and performing voice synthesis on the text information, so as to obtain a voice audio corresponding to the text information.

The text information in this step may be a text phrase, and the text phrase is a text phrase input by a user or a text phrase selected by a user from a text phrase database. The present application does not limit the language used for text phrases. Exemplarily, the text phrase may be "Today is the weekend" in Chinese, or the text phrase may be "happy weekend".

There are many kinds of implementations for performing voice synthesizing on text information in this step, which is not limited in this application. Exemplarily, an implementation of this step comprises: for any text phrase, converting the text phrase into a corresponding voice using a text-to-speech method; in response to an operation of selecting a timbre, selecting a target timbre from a plurality of preset timbres; based on the target timbre, converting the voice corresponding to the text phrase into a voice audio.

"Converting the text phrase into a corresponding voice using a text-to-speech method" refers to converting the text phrase into corresponding audio data. The content reflected by the audio data is consistent with the text phrase.

Further, languages used in the audio data and the text phrases may be the same or different, which is not limited in this application. Exemplarily, the language used for the audio data is English, and the language used for the text phrase is Chinese.

Further, if the languages used for the audio data and the text phrase are different, the specific implementation thereof may be: first translating the text phrase to obtain a text phrase in a target language, and then converting the text phrase in the target language into corresponding audio data. The target language is the language used for the audio data.

Timbre is timbre data, which is used to modify the obtained audio data corresponding to the text phrase.

In some embodiments, the timbre may be simply set to include, but not limited to, a male timbre, a female timbre, a child timbre, and a cartoon animation character timbre. Alternatively, different timbre data is formed according to character attribute data and stored in a timbre database. By "selecting timbre", it means selecting one of the timbres as the target timbre. "Converting the voice corresponding to the text phrase into a voice audio based on the target timbre" means modifying the obtained audio data corresponding to the text phrase using the selected timbre data.

Exemplarily, if an input text phrase is "It's finally the weekend," and a timbre is selected to be a male timbre, the formed vocal sample is audio data of "It's finally the weekend" recited in a male timbre.

S120. obtaining an initial music audio, the initial music audio including a music key point, and music characteristics of the initial music audio having a sudden change at the position of the audio key point.

The method for obtaining the initial music audio in this step is as follows: in response to an operation of selecting a music category, selecting a target music category from a plurality of preset music categories; and selecting one music audio as the initial music audio from a plurality of music audios corresponding to the target music category.

In some embodiments, the method for selecting one music audio as the initial music audio from a plurality of music audios corresponding to the target music category is as follows: obtaining a plurality of music style templates corresponding to the target music category; in response to an operation of selecting a music style template, selecting a target music style template from the plurality of music style templates as the initial music audio; or, randomly selecting a music style template from the plurality of music style templates as the initial music audio.

Music style templates refer to preset music clips. Music style templates are audio templates for generating music, created based on melody, chord progression and orchestration. Music style templates may be music clips with lyrics or pure music clips.

In this technical solution, a music style template is used as a background music. In practice, a music style template database may be set in advance, and when performing this step, the required music style template is selected from the music style template database.

In some embodiments, the music key point is located at any of a plurality of preset positions in the music style template, wherein the plurality of preset positions include at least one of: a preset position before a chorus in the music style templates, a position in the music style template where its beat intensity is greater than or equal to a preset threshold, a preset position before or after a phrase in the music style template. In the above, "a phrase in the music style template" means that the music style template includes lyric sections, and the phrase is in the lyric sections. The essence of such setting is to select a position, which is conducive to recognition, as a music key point for injecting voice audio. Since the music style templates are background music with respect to voice audios, such setting may enable voice audios inserted at music key points to not be covered by background music and to be easily recognized.

S130. synthesizing the voice audio and the initial music audio based on the position of the music key point to obtain a target music audio; in the target music audio, the voice audio appears at the position of the music key point of the initial music audio.

The focus of this step is to insert the voice audio into the audio key point of the target music style template to form the target music audio.

A music key point is an injection point for a voice audio, and may also be understood as an insertion point for a voice audio. Further, considering that in practice, a voice audio often needs to last for a period of time when being played, a music key point is a starting position for inserting a voice audio. Exemplarily, if a certain insertion point in a certain music style template is located at the 12th second from the start time of the music style template, then inserting a voice audio at the insertion point in the target music style template means that the voice audio is inserted at the 12th second from the start time of the music style template, so that when the music style template is played to the 12th second, the voice audio also starts to play. In other words, align the first second of the voice audio with the 12th second from the start time of the music style template.

Further, the implementation of this step may further comprise: performing at least one of reverberation processing, delay processing, compression processing and volume processing on the injected voice audio and the target music style template to obtain the target music audio. The essence of such setting is to modify the target music and make the overall effect of the target music more harmonious and elegance.

In the above technical solution, obtaining text information, and converting the text information into a corresponding voice audio; and obtaining an initial music audio, wherein the initial music audio comprises a music key point, and music characteristics of the initial music audio have a sudden change at the position of an audio key point; so that, on the basis of the position of the music key point, synthesizing the voice audio and the initial music audio to obtain a target music audio. In the target music audio, the voice audio appears at the position of the music key point of the initial music audio. Thus, a music audio is generated from text information, and the user can customize the content of the text information and customize the initial music audio, so as to achieve the purpose of personalized music customization, thereby overcoming an existing deficiency that personalized music customization cannot be achieved.

Figure 2:
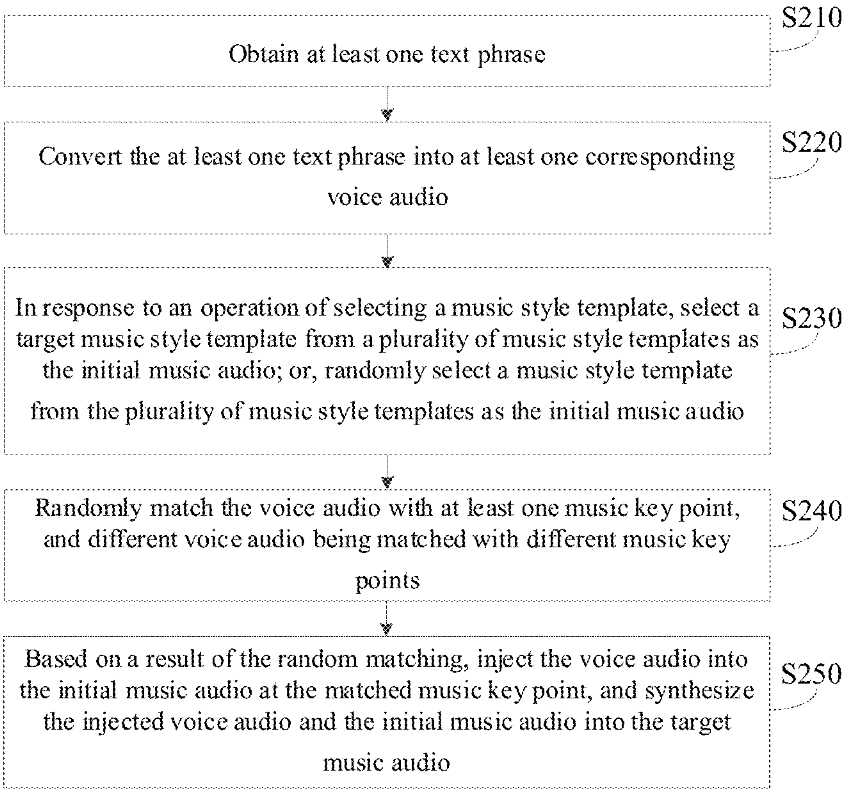
FIG. 2 is a flow chart of another music generation method provided by an embodiment of the present disclosure.

FIG. 2 is a flow chart of another music generation method provided by an embodiment of the present disclosure. FIG. 2 is a specific example in FIG. 1. Referring to FIG. 2, the method comprises:

S210. obtaining at least one text phrase.

The text phrase in this step is a text phrase input by a user or a text phrase selected by a user from a text phrase database. This application does not limit the language used for text phrases.

S220. converting the at least one text phrase into at least one corresponding voice audio.

There are many kinds of implementations for implementing this step, which is not limited in this application. Exemplarily, an implementation of this step comprises: for any text phrase, converting the text phrase into a corresponding voice using a text-to-speech method; in response to an operation of selecting a timbre, selecting a target timbre from a plurality of preset timbres; based on the target timbre, converting the voice corresponding to the text phrase into a voice audio.

"Converting the text phrase into a corresponding voice using a text-to-speech method" refers to converting the text phrase into corresponding audio data. The content reflected by the audio data is consistent with the text phrase.

Further, languages used in the audio data and the text phrases may be the same or different, which is not limited in this application. Exemplarily, the language used for the audio data is English, and the language used for the text phrase is Chinese.

Further, if the languages used for the audio data and the text phrase are different, the specific implementation thereof may be: first translating the text phrase to obtain a text phrase in a target language, and then converting the text phrase in the target language into corresponding audio data. The target language is the language used for the audio data.

Timbre is timbre data, which is used to modify the obtained audio data corresponding to the text phrase.

In some embodiments, the timbre may be simply set to include, but not limited to, a male timbre, a female timbre, a child timbre, and a cartoon animation character timbre. By "selecting timbre", it means selecting one of the timbres as the target timbre. "Converting the voice corresponding to the text phrase into a voice audio based on the target timbre" means modifying the obtained audio data corresponding to the text phrase using the selected timbre data.

S230. in response to an operation of selecting a music style template, selecting a target music style template from a plurality of music style templates as the initial music audio; or, randomly selecting a music style template from the plurality of music style templates as the initial music audio.

Music style templates refer to preset music clips. Music style templates are audio templates for generating music, created based on melody, chord progression and orchestration. Music style templates may be music clips with lyrics or pure music clips.

In this technical solution, a music style template is used as a background music. In practice, a music style template database may be set in advance, and when performing this step, the required music style template is selected from the music style template database.

In some embodiments, the music key point is located at any of a plurality of preset positions in the music style template, wherein the plurality of preset positions include at least one of: a preset position before a chorus in the music style template, a position in the music style template where its beat intensity is greater than or equal to a preset threshold, a preset position before or after a phrase in the music style templates. In the above, "a phrase in the music style template" means that the music style template includes lyric sections, and the phrase is in the lyric sections. The essence of such setting is to select a position, which is conducive to recognition, as a music key point for injecting voice audio. Since the music style templates are background music with respect to voice audios, such setting may enable voice audios inserted into music key points to not be covered by background music and to be easily recognized.

S240. randomly matching the voice audio with at least one music key point, and different voice audios being matched with different music key points.

S250. injecting the voice audio into the initial music audio at a matched music key point based on a result of the random matching, and synthesizing the injected voice audio and the initial music audio into the target music audio.

Exemplarily, the selected music style template includes 10 music key points, and there are 2 voice audios that need to be injected. It is possible to select 1 music key point randomly from these 10 music key points to establish a matching relationship between the selected first music key point and a first voice audio, and then randomly select one of the remaining 9 key points to establish a matching relationship between the selected second music key point and a second voice audio. And each voice audio only uniquely corresponds to one music key point, and different voice audios correspond to different music key points. According to the matching relationship, the voice audios are injected at the matched music key points thereof to synthesize a target music audio.

In the above technical solution, based on the result of randomly matching, at least one voice audio is injected at a matched music key point in a target music style template, the algorithm of which is simple and easy to implement.

Figure 3:
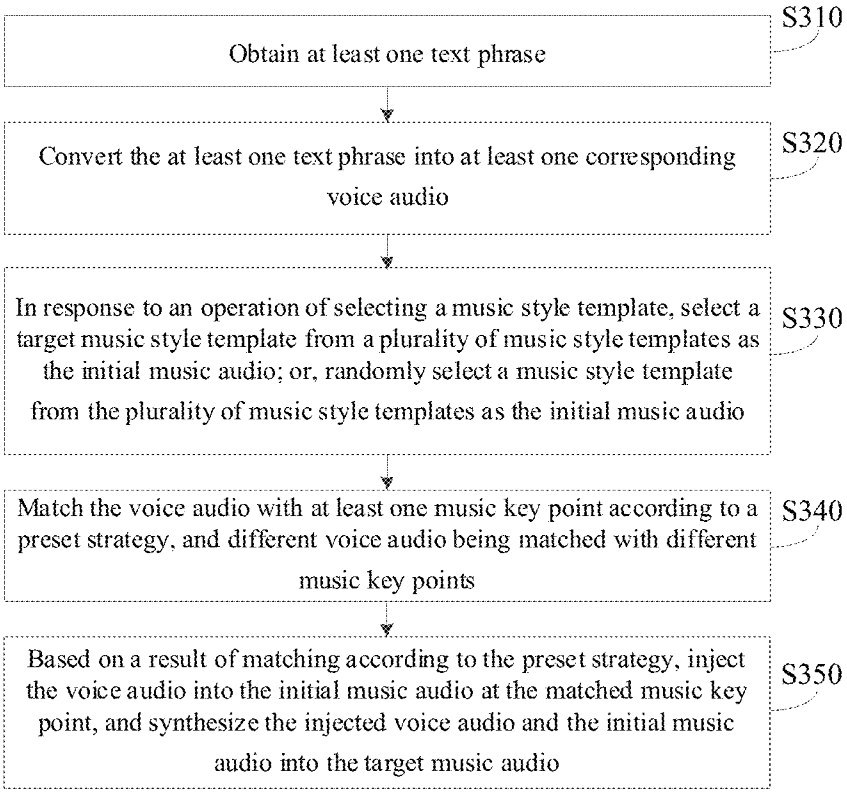
FIG. 3 is a flow chart of another music generation method provided by an embodiment of the present disclosure.

FIG. 3 is a flow chart of another music generation method provided by an embodiment of the present disclosure. FIG. 3 is a specific example of FIG. 1. Referring to FIG. 3, the method comprises:

S310. obtaining at least one text phrase.

The text phrase in this step is a text phrase input by a user or a text phrase selected by a user from a text phrase database. This application does not limit the language used for text phrases.

S320. converting the at least one text phrase into at least one corresponding voice audio.

There are many kinds of implementations for implementing this step, which is not limited in this application. Exemplarily, an implementation of this step comprises: for any text phrase, converting the text phrase into a corresponding voice using a text-to-speech method; in response to an operation of selecting a timbre, selecting a target timbre from a plurality of preset timbres; based on the target timbre, converting the voice corresponding to the text phrase into a voice audio.

"Converting the text phrase into a corresponding voice using a text-to-speech method" refers to converting the text phrase into corresponding audio data. The content reflected by the audio data is consistent with the text phrase.

Further, languages used in the audio data and the text phrases may be the same or different, which is not limited in this application. Exemplarily, the language used for the audio data is English, and the language used for the text phrase is Chinese.

Further, if the languages used for the audio data and the text phrase are different, the specific implementation thereof may be: first translating the text phrase to obtain a text phrase in a target language, and then converting the text phrase in the target language into corresponding audio data. The target language is the language used for the audio data.

Timbre is timbre data, which is used to modify the obtained audio data corresponding to the text phrase.

In some embodiments, the timbre may be simply set to include, but not limited to, a male timbre, a female timbre, a child timbre, and a cartoon animation character timbre. By "selecting timbre", it means selecting one of the timbres as the target timbre. "Converting the voice corresponding to the text phrase into a voice audio based on the target timbre" means modifying the obtained audio data corresponding to the text phrase using the selected timbre data.

S330. in response to an operation of selecting a music style template, selecting a target music style template from a plurality of music style templates as the initial music audio; or, randomly selecting a music style template from the plurality of music style templates as the initial music audio.

Music style templates refer to preset music clips. Music style templates are audio templates for generating music, created based on melody, chord progression and orchestration. Music style templates may be music clips with lyrics or pure music clips.

In this technical solution, a music style template is used as a background music. In practice, a music style template database may be set in advance, and when performing this step, the required music style template is selected from the music style template database.

In some embodiments, the music key point is located at any of a plurality of preset positions in the music style template, wherein the plurality of preset positions include at least one of: a preset position before a chorus in the music style templates, a position in the music style template where its beat intensity is greater than or equal to a preset threshold, a preset position before or after a phrase in the music style template. In the above, "a phrase in the music style template" means that the music style template includes lyric sections, and the phrase is in the lyric sections. The essence of such setting is to select a position, which is conducive to recognition, as a music key point for injecting voice audio. Since the music style templates are background music with respect to voice audios, such setting may enable voice audios inserted into music key points to not be covered by background music and to be easily recognized.

S340. matching the voice audio with at least one music key point according to a preset strategy, and different voice audios being matched with different music key points.

The preset strategy is a manually preset matching rule. In practice, there may be many "preset strategies", which is not limited in this application. Exemplarily, a music style template may be divided into paragraphs according to the content expressed by the music style template, so that different paragraphs express different meanings, and each paragraph includes one or more music key points. According to the consistency between the meaning expressed by a voice audio and the meaning expressed by a paragraph, a matching relationship between the voice audio and the music key point is established.

Exemplarily, assuming that a music style template may be divided into two paragraphs, wherein the first paragraph is used to praise spring, and the second paragraph is used to praise summer. There are two voice audios. The first voice audio is "Don't know who cuts thin leaves. The spring breeze in February is like scissors." The second voice audio is "The green trees are thick and the summer is long, and the balcony reflects into the pond." A matching relationship between the first voice audio and a music key point in the first paragraph is established, and a matching relationship between the second voice audio and a music key point in the second paragraph is established.

Alternatively, matching relationship between voice audios and music key points may be set to be established one by one in order of playback times. Exemplarily, assuming that a music style template includes 10 music key points and there are two voice audios, a matching relationship between the first voice audio and a first music key point is established, and a matching relationship between the second voice audio and a second music key point is established, wherein the playback time of the first voice audio is earlier than that of the second voice audio, and the playback time of the first music key point is earlier than that of the second music key point.

S350. injecting the voice audio into the initial music audio at a matched music key point based on the result of matching according to the preset strategy, and synthesizing the injected voice audio and the initial music audio into the target music audio.

In the above technical solution, by setting to inject at least one voice audio into a target music style template at a matched music key point based on a result of matching according to a preset strategy, the voice audio and the target music style template may be matched, and the meanings of these two complement each other and explain each other, which is helpful to make the customized music more harmonious.

It should be noted that, for the sake of simple description, the foregoing method embodiments are expressed as a series of action combinations. However, those skilled in the art should know that the present disclosure is not limited by the described action order, because certain steps may be performed in other orders or simultaneously in accordance with the present disclosure. Secondly, those skilled in the art should also know that the embodiments described in the specification are preferred embodiments, and the actions and modules involved are not necessarily needed for the present disclosure.

Figure 4:
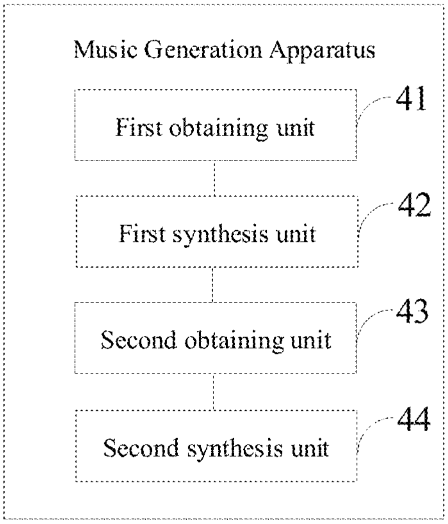
FIG. 4 is a schematic structural diagram of a music generation apparatus in an embodiment of the present disclosure.

FIG. 4 is a schematic structural diagram of a music generation apparatus in an embodiment of the present disclosure. The music generation apparatus provided by the embodiment of the present disclosure may be configured in a client or in a server. Referring to FIG. 4, the music generation apparatus specifically comprises:

- a first obtaining unit 41, configured to obtain text information;
- a first synthesis unit 42, configured to perform voice synthesis on the text information, so as to obtain a voice audio corresponding to the text information;
- a second obtaining unit 43, configured to obtain an initial music audio, the initial music audio including a music key point, and music characteristics of the initial music audio having a sudden change at the position of an audio key point;
- a second synthesis unit 44, configured to synthesize the voice audio and the initial music audio based on the position of the music key point to obtain a target music audio; in the target music audio, the voice audio appears at the position of the music key point of the initial music audio.

In some embodiments, the synthesis unit 42 is configured to convert the text information into a corresponding voice using a text-to-speech method; in response to an operation of selecting a timbre, select a target timbre from a plurality of preset timbres; and based on the target timbre, convert the voice corresponding to the text information into a voice audio.

In some embodiments, the second obtaining unit 43 is configured to select a target music category from a plurality of preset music categories in response to an operation of selecting a music category; and select one music audio as the initial music audio from a plurality of music audios corresponding to the target music category.

In some embodiments, the second obtaining unit 43 selecting one music audio as the initial music audio from a plurality of music audios corresponding to the target music category comprises: obtaining a plurality of music style templates corresponding to the target music category, the music style templates being audio templates for generating music, created based on melody, chord progression and orchestration; and in response to an operation of selecting a music style template, selecting a target music style template from the plurality of music style templates as the initial music audio; or, randomly selecting a music style template from the plurality of music style templates as the initial music audio.

In some embodiments, the audio key point is located at any of a plurality of preset positions in the music style template, wherein the plurality of preset positions include at least one of: a preset position before a chorus in the music style template, a position in the music style template where its beat intensity is greater than or equal to a preset threshold, a preset position before or after a phrase in the music style template.

In some embodiments, the second synthesis unit 44 synthesizing the voice audio and the initial music audio based on the position of the music key point to obtain the target music audio comprises: randomly matching the voice audio with at least one music key point, and different voice audios being matched with different music key points; and injecting the voice audio into the initial music audio at a matched music key point based on a result of the randomly matching, and synthesizing the injected voice audio and the initial music audio into the target music audio.

In some embodiments, the second synthesis unit 44 synthesizing the voice audio and the initial music audio based on the position of the music key point to obtain the target music audio comprises: matching the voice audio with at least one music key point according to a preset strategy, and different voice audios being matched with different music key points; and injecting the voice audio into the initial music audio at matched music key point based on the result of matching according to the preset strategy, and synthesizing the injected voice audio and the initial music audio into the target music audio.

In some embodiments, the second synthesis unit 44 synthesizing the injected voice audio and the initial music audio into the target music audio comprises: performing at least one of reverberation processing, delay processing, compression processing and volume processing on the injected voice audio and the initial music audio to obtain the target music audio.

The music generation apparatus provided by the embodiments of the present disclosure may perform steps performed by the client or the server in the music generation method provided by the method embodiments of the present disclosure, and has execution steps and beneficial effects, which will not be repeated here again.

In some embodiments, the division of various units in the information display apparatus is only a logical function division. In actual implementation, there may be other division methods. For example, at least two units in the information display apparatus may be implemented as one unit; various units in the music generation apparatus may also be divided into multiple sub-units. It is understood that various units or sub-units may be implemented as electronic hardware, or a combination of computer software and electronic hardware. Whether these functions are performed in hardware or software depends on the specific application and design constraints of the technical solution. Those skilled in the art may use different methods to implement the described functions for each specific application.

Figure 5:
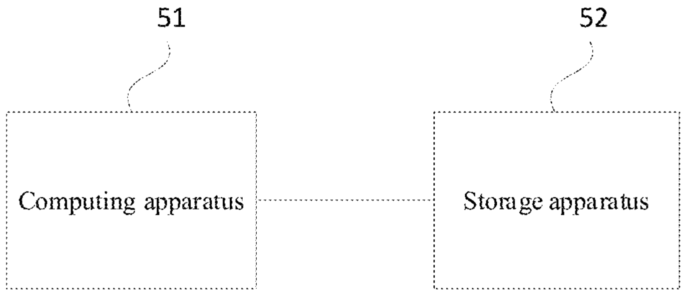
FIG. 5 is an exemplary block diagram of a system including at least one computing apparatus and at least one storage apparatus for storing instructions provided by an embodiment of the present disclosure.

FIG. 5 is an exemplary block diagram of a system including at least one computing apparatus and at least one storage apparatus for storing instructions provided by an embodiment of the present disclosure. In some embodiments, the system may be used for big data processing, and the at least one computing apparatus and the at least one storage apparatus may be deployed in a distributed manner, making the system a distributed data processing cluster.

As shown in FIG. 5, the system comprises: at least one computing apparatus 51 and at least one storage apparatus 52 for storing instructions. It may be understood that the storage apparatus 52 in this embodiment may be a volatile memory or a non-volatile memory, or may include both volatile and non-volatile memories.

In some implementations, the storage apparatus 52 stores the following elements, executable units or data structures, or subsets thereof, or extensions thereof: an operating system and application programs.

The operating system includes various system programs, such as a framework layer, a core library layer, a driver layer, etc., which are used to implement various basic tasks and process hardware-based tasks. Application programs include various application programs, such as media players, browsers, etc., which are used to implement various application tasks. A program that implements the music generation method provided by the embodiments of the present disclosure may be included in an application program.

In the embodiment of the present disclosure, the at least one computing apparatus 51 is used to execute steps of various embodiments of the music generation method provided by the embodiments of the present disclosure by calling a program or instruction stored in the at least one storage apparatus 52, specifically, it may be a program or instruction stored in an application program.

The music generation method provided by the embodiment of the present disclosure may be applied in the computing apparatus 51 or implemented by the computing apparatus 51.

The computing apparatus 51 may be an integrated circuit chip with signal processing capabilities. During the implementation, each step of the above method may be completed by integrated logic circuits in hardware or instructions in the form of software in the computing apparatus 51. The above computing apparatus 51 may be a general-purpose processor, a Digital Signal Processor (DSP), an Application Specific Integrated Circuit (ASIC), a Field Programmable Gate Array (FPGA), or other programmable logic devices, discrete gates or transistor logic devices, discrete hardware components. The general-purpose processor may be a microprocessor or the processor may be any conventional processor, etc.

The steps of the music generation method provided by the embodiments of the present disclosure may be directly embodied as executed and completed by a hardware decoding processor, or by a combination of hardware and software units in the decoding processor. The software unit may be located in a widely used storage medium in the art, such as a random-access memory, a flash memory, a read-only memory, a programmable read-only memory or an electrically erasable programmable memory, a register etc. The storage medium is located in the storage apparatus 52. The computing apparatus 51 reads the information in the storage apparatus 52 and completes the steps of the method in combination with its hardware.

An embodiment of the present disclosure also provides a computer-readable storage medium that stores programs or instructions that, when executed by at least one computing apparatus, cause the at least one computing apparatus to perform steps as those in various embodiments of the music generation methods, which will not be repeated here to avoid repeated description. The computing apparatus may be the computing apparatus 51 shown in FIG. 5. In some embodiments, the computer-readable storage medium is a non-transitory computer-readable storage medium.

An embodiment of the present disclosure also provides a computer program product, wherein the computer program product includes a computer program, the computer program is stored in a non-transitory computer-readable storage medium, and at least one processor of the computer reads and executes the computer program from the storage medium, and causes the computer to execute steps as those in various embodiments of the music generation methods, which will not be repeated here to avoid repeated description.

It should be noted that, the terms herein "comprise", "include" or any other variations thereof are intended to cover a non-exclusive inclusion such that a process, method, article or apparatus that comprises a series of elements includes not only those elements, but also other elements that are not expressly listed, or elements inherent to the process, method, article or apparatus. Without further limitation, an element defined by the statement "comprises . . . " does not exclude the presence of additional identical elements in the process, method, article or apparatus that includes the element.

Those skilled in the art may understand that, although some embodiments described herein include certain features included in other embodiments but not others, combinations of features of different embodiments are meant to be within the scope of the present disclosure and form different embodiments.

Those skilled in the art may understand that, the description of each embodiment has its own focus. For parts that are not described in detail in a certain embodiment, they may be referred to relevant descriptions in other embodiments.

Although the embodiments of the present disclosure have been described in conjunction with the accompanying drawings, those skilled in the art may make various modifications and variations without departing from the spirit and scope of the disclosure, and all such modifications and variations fall within the scope defined by the appended claims.

What is claimed is:

1. A music generation method, comprising:

obtaining text information, and performing voice synthesis on the text information, so as to obtain a voice audio corresponding to the text information;

obtaining an initial music audio, the initial music audio including a music key point, and music characteristics of the initial music audio having a sudden change at a position of the music key point, wherein the initial music audio is a music style template, the music style template is an audio template for generating music, and the music key point is located at any of a plurality of preset positions in the music style template, and wherein the plurality of preset positions include at least one of: a position in the music style template where its beat intensity is greater than or equal to a threshold, or a position before or after a phrase in the music style templates; and synthesizing the voice audio and the initial music audio based on the position of the music key point to obtain a first music audio; in the first music audio, the voice audio appears at the position of the music key point of the initial audio music.

2. The method according to claim 1, wherein the performing voice synthesis on the text information to obtain the voice audio corresponding to the text information comprises:

converting the text information into a corresponding voice using a text-to-speech method;

in response to an operation of selecting a timbre, selecting a first timbre from a plurality of timbres; and based on the first timbre, converting the voice corresponding to the text information into a voice audio.

3. The method according to claim 1, wherein the obtaining an initial music audio comprises:

in response to an operation of selecting a music category, selecting a first music category from a plurality of music categories; and selecting one music audio as the initial music audio from a plurality of music audios corresponding to the first music category.

4. The method according to claim 3, wherein the selecting one music audio as the initial music audio from a plurality of music audios corresponding to the first music category comprises:

obtaining a plurality of music style templates corresponding to the first music category, the music style templates being audio templates for generating music, created based on melody, chord progression and orchestration; and in response to an operation of selecting a music style template, performing one of: selecting a first music style template from the plurality of music style templates as the initial music audio; randomly selecting a music style template from the plurality of music style templates as the initial music audio.

5. The method according to claim 1, wherein the synthesizing the voice audio and the initial music audio based on the position of the music key point to obtain a first music audio comprises:

randomly matching the voice audio with at least one music key point, and different voice audios being matched with different music key points; and injecting the voice audio into the initial music audio at a matched music key point based on a result of the randomly matching, and synthesizing the injected voice audio and the initial music audio into the first music audio.

6. The method according to claim 5, wherein the synthesizing the injected voice audio and the initial music audio into the first music audio comprises:

performing at least one of reverberation processing, delay processing, compression processing and volume processing on the injected voice audio and the initial music audio to obtain the first music audio.

7. The method according to claim 1, wherein the synthesizing the voice audio and the initial music audio based on the position of the music key point to obtain a first music audio comprises:

matching the voice audio with at least one music key point according to a preset strategy, and different voice audios being matched with different music key points; and injecting the voice audio into the initial music audio at a matched music key point based on the result of matching according to the preset strategy, and synthesizing the injected voice audio and the initial music audio into the first music audio.

8. A system comprising at least one computing apparatus and at least one storage apparatus for storing instructions, wherein the instructions, when executed by the at least one computing apparatus, cause the at least one computing apparatus to perform steps of a music generation method comprising:

obtaining text information, and performing voice synthesis on the text information, so as to obtain a voice audio corresponding to the text information;

obtaining an initial music audio, the initial music audio including a music key point, and music characteristics of the initial music audio having a sudden change at a position of the music key point, wherein the initial music audio is a music style template, the music style template is an audio template for generating music, and the music key point is located at any of a plurality of preset positions in the music style template, and wherein the plurality of preset positions include at least one of: a position in the music style template where its beat intensity is greater than or equal to a threshold, or a position before or after a phrase in the music style templates; and synthesizing the voice audio and the initial music audio based on the position of the music key point to obtain a first music audio; in the first music audio, the voice audio appears at the position of the music key point of the initial audio music.

9. The system according to claim 8, wherein the performing voice synthesis on the text information to obtain the voice audio corresponding to the text information comprises:

converting the text information into a corresponding voice using a text-to-speech method;

in response to an operation of selecting a timbre, selecting a first timbre from a plurality of preset timbres; and based on the first timbre, converting the voice corresponding to the text information into a voice audio.

10. The system according to claim 8, wherein the obtaining an initial music audio comprises:

in response to an operation of selecting a music category, selecting a first music category from a plurality of preset music categories; and selecting one music audio as the initial music audio from a plurality of music audios corresponding to the first music category.

11. The system according to claim 10, wherein the selecting one music audio as the initial music audio from a plurality of music audios corresponding to the first music category comprises:

obtaining a plurality of music style templates corresponding to the first music category, the music style templates being audio templates for generating music, created based on melody, chord progression and orchestration; and in response to an operation of selecting a music style template, performing one of: selecting a first music style template from the plurality of music style templates as the initial music audio; randomly selecting a music style template from the plurality of music style templates as the initial music audio.

12. The system according to claim 8, wherein the synthesizing the voice audio and the initial music audio based on the position of the music key point to obtain a first music audio comprises:

randomly matching the voice audio with at least one music key point, and different voice audios being matched with different music key points; and injecting the voice audio into the initial music audio at a matched music key point based on a result of the randomly matching, and synthesizing the injected voice audio and the initial music audio into the first music audio.

13. A non-transitory computer-readable storage medium, wherein the computer-readable storage medium stores a program or instructions, which, when executed by at least one computing apparatus, cause the at least one computing apparatus to perform steps of a music generation method comprising:

obtaining text information, and performing voice synthesis on the text information, so as to obtain a voice audio corresponding to the text information;

obtaining an initial music audio, the initial music audio including a music key point, and music characteristics of the initial music audio having a sudden change at a position of the music key point, wherein the initial music audio is a music style template, the music style template is an audio template for generating music, and the music key point is located at any of a plurality of preset positions in the music style template, and wherein the plurality of preset positions include at least one of: a position in the music style template where its beat intensity is greater than or equal to a threshold, or a position before or after a phrase in the music style templates; and synthesizing the voice audio and the initial music audio based on the position of the music key point to obtain a first music audio; in the first music audio, the voice audio appears at the position of the music key point of the initial audio music.

14. The non-transitory computer-readable storage medium according to claim 13, wherein the performing voice synthesis on the text information to obtain the voice audio corresponding to the text information comprises:

converting the text information into a corresponding voice using a text-to-speech method;

in response to an operation of selecting a timbre, selecting a first timbre from a plurality of preset timbres; and based on the first timbre, converting the voice corresponding to the text information into a voice audio.

15. The non-transitory computer-readable storage medium according to claim 13, wherein the obtaining an initial music audio comprises:

in response to an operation of selecting a music category, selecting a first music category from a plurality of preset music categories; and selecting one music audio as the initial music audio from a plurality of music audios corresponding to the first music category.

16. The non-transitory computer-readable storage medium according to claim 15, wherein the selecting one music audio as the initial music audio from a plurality of music audios corresponding to the first music category comprises:

obtaining a plurality of music style templates corresponding to the first music category, the music style templates being audio templates for generating music, created based on melody, chord progression and orchestration; and in response to an operation of selecting a music style template, performing one of: selecting a first music style template from the plurality of music style templates as the initial music audio; randomly selecting a music style template from the plurality of music style templates as the initial music audio.

17. The non-transitory computer-readable storage medium according to claim 13, wherein the synthesizing the voice audio and the initial music audio based on the position of the music key point to obtain a first music audio comprises:

randomly matching the voice audio with at least one music key point, and different voice audios being matched with different music key points; and injecting the voice audio into the initial music audio at a matched music key point based on a result of the randomly matching, and synthesizing the injected voice audio and the initial music audio into the first music audio.

* * * * *